United States Patent
Tseng et al.

(10) Patent No.: US 9,075,494 B2
(45) Date of Patent: Jul. 7, 2015

(54) SYSTEMS AND METHODS FOR PERFORMING OBJECT SELECTION

(71) Applicant: Cyberlink Corp., Shindian City, Taipei (TW)

(72) Inventors: Wei-Hsin Tseng, New Taipei (TW); Ho-Chao Huang, New Taipei (TW); Chih-Chao Ma, Taichung (TW)

(73) Assignee: CYBERLINK CORP., Shindian, Taipei (TW)

( * ) Notice: Subject to any disclaimer, the term of this patent is extended or adjusted under 35 U.S.C. 154(b) by 114 days.

(21) Appl. No.: 13/756,974

(22) Filed: Feb. 1, 2013

(65) Prior Publication Data

US 2014/0219580 A1    Aug. 7, 2014

(51) Int. Cl.
    *G06T 5/00*      (2006.01)
    *G06F 3/048*     (2013.01)
    *G06T 11/60*     (2006.01)
    *G06T 7/00*      (2006.01)

(52) U.S. Cl.
    CPC .............. *G06F 3/048* (2013.01); *G06T 11/60* (2013.01); *G06T 7/0081* (2013.01); *G06T 2207/20096* (2013.01)

(58) Field of Classification Search
    CPC ............... G06T 7/0022; G06T 2207/10021; G06T 7/20; G06F 3/04812; G06F 17/30867; G06F 3/03547; G06F 3/0488; H04N 13/004; H04N 13/007
    USPC ............ 382/254; 345/63, 173, 166, 145, 159, 345/146, E13.075; 707/706, 223; 715/784
    See application file for complete search history.

(56) References Cited

U.S. PATENT DOCUMENTS

| | | | | |
|---|---|---|---|---|
| 5,808,601 | A * | 9/1998 | Leah et al. | 715/856 |
| 6,040,821 | A * | 3/2000 | Franz et al. | 345/159 |
| 7,236,162 | B2 * | 6/2007 | Morrison et al. | 345/173 |
| 8,176,434 | B2 * | 5/2012 | Saul et al. | 715/784 |
| 2003/0152262 | A1 | 8/2003 | Mao et al. | |
| 2009/0282359 | A1 * | 11/2009 | Saul et al. | 715/784 |
| 2010/0201645 | A1 * | 8/2010 | Asami | 345/173 |
| 2011/0122234 | A1 * | 5/2011 | Kikkawa | 348/51 |
| 2011/0243443 | A1 | 10/2011 | Varekamp | |
| 2013/0246383 | A1 * | 9/2013 | White et al. | 707/706 |
| 2014/0093183 | A1 * | 4/2014 | Ting et al. | 382/254 |
| 2014/0173505 | A1 * | 6/2014 | Urakawa | 715/784 |

FOREIGN PATENT DOCUMENTS

JP            2003114904 A  *  4/2003  ............. G06F 17/30

OTHER PUBLICATIONS

J. Reese and W. Barrett, "Image Editing with Intelligent Paint" Eurographics 2002.

* cited by examiner

*Primary Examiner* — Mekonen Bekele
(74) *Attorney, Agent, or Firm* — McClure, Qualey & Rodack, LLP

(57) ABSTRACT

Various embodiments are disclosed for selecting a region of interest within an object. One embodiment is a method for editing a digital image in an image editing device. The method comprises obtaining a first position within a digital image, the first position being specified by a pointer. The method further comprises defining a first selection region based on the first position and obtaining a second position within the digital image, the second position being specified by the pointer. The method further comprises determining movement of the pointer between the first position and the second position and predicting future movement by the pointer based on the determined movement. Based on the determined movement and the predicted future movement, the first selection region is expanded to define a second selection region.

30 Claims, 12 Drawing Sheets

(REMAINDER OF OBJECT AUTOMATICALLY SELECTED)

SYSTEMS AND METHODS FOR PERFORMING OBJECT SELECTION

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate digital images.

Conventional image processing software typically provides a selection tool for allowing users to select an object or regions within objects for editing purposes. Examples of selection tools may include a brush graphic, a circle graphic, or a rectangular graphic shown on the display. Some selection tools offer more flexibility than others in selecting objects. However, image content varies, and therefore, selection techniques provided by image processing software may be inefficient in some cases. Many times, users still need to perform operations on a large portion of the object or region of interest in order to define a selection region of interest.

SUMMARY

Briefly described, one embodiment, among others, is a method for editing a digital image in an image editing device. The method comprises obtaining a first position within a digital image, the first position being specified by a pointer. The method further comprises defining a first selection region based on the first position and obtaining a second position within the digital image, the second position being specified by the pointer. The method further comprises determining movement of the pointer between the first position and the second position and predicting future movement by the pointer based on the determined movement. Based on the determined movement and the predicted future movement, the first selection region is expanded to define a second selection region.

Another embodiment is a system for editing a digital image. The system comprises an image content analyzer configured to obtain a first position and a second position within a digital image, the position being specified by a pointer. The system further comprises a selection region generator configured to define a first selection region based on the first position and a pointer movement estimator configured to determine movement of the pointer between the first position and the second position. The pointer movement estimator is further configured to predict future movement by the pointer based on the determined movement, wherein the selection region generator facilitates selection of the object by expanding the first selection region to define a second selection region based on the determined movement and the predicted future movement.

Another embodiment is a method for editing a digital image in an image editing device. The method comprises defining a pointer surrounded by a mask having a specific shape and obtaining a first position within a digital image, the first position being specified by the pointer. The method further comprises defining a first selection region based on the first position and obtaining a second position within the digital image, the second position being specified by the pointer. The method further comprises determining movement of the pointer between the first position and the second position and predicting future movement by the pointer based on the determined movement. Based on the determined movement and the predicted future movement, a determination is made on whether to expand the first selection region to define a second selection region. The method further comprises expanding the first selection region to define the second selection region in response to a determination to expand the first selection region.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 12A:
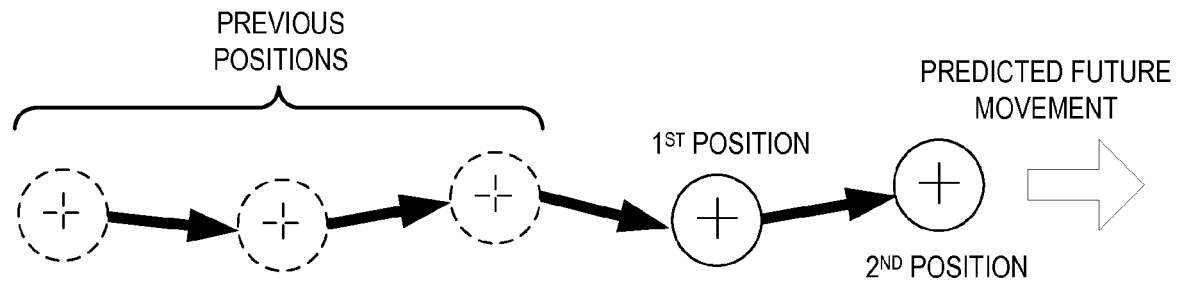
Figure 12B:
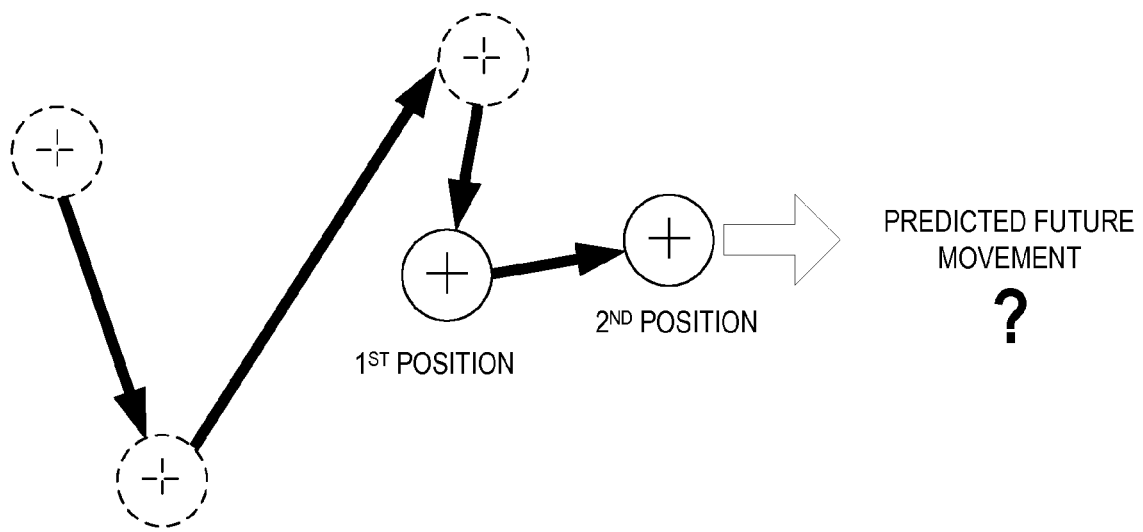

Reference is made to FIGS. 12A and 12B, which illustrate prediction of future movement by the pointer in accordance with various embodiments of the present disclosure.

DETAILED DESCRIPTION

One perceived shortcoming with traditional image editing solutions is the degree of time and complexity involved in the selection of objects or regions within a digital image for editing purposes. With many applications, users must manually move a pointer such a mouse pointer to various locations within an object of interest in order to select the object or a region within the object for editing purposes. As one can appreciate, this can be a time-consuming process. Some selection methods require the user to use a pointer to manually outline an object of interest, which can be time consuming.

While some more advanced selection methods include analysis of the image content to estimate the boundary of objects, such techniques may still require the user to input the selection location as the content of images vary. As such, regions or portions of a digital image which are not part of an object of interest may inadvertently be included in the selection region due to similarities in color and other attributes of the object. On the other hand, some portions of the object of interest may be inadvertently omitted due to features that differ from the remaining portion of the object.

Various embodiments are disclosed for providing users with an efficient means for selecting objects that consider variations between the locations of a pointer controlled by a user. A selection region is modified or updated according to dynamically adjusted increments, thereby allowing the user to quickly and efficiently select objects of interest for such editing operations as copying, pasting, etc. For example, one embodiment is a method for editing a digital image in an image editing device that comprises obtaining a first position within a digital image, the first position being specified by a pointer.

The method further comprises identifying an object corresponding to the first position, defining a first selection region based on the first position, determining movement of the pointer relative to the first position, and predicting future movement by the pointer based on the determined movement. Based on the predicted future movement, the first selection region is expanded to define a second selection region. Upon definition of the second selection region, the user may, for example, edit the second selection region, save the second selection region as a mask for later editing, and/or perform other operations on the second selection region.

Figure 1:
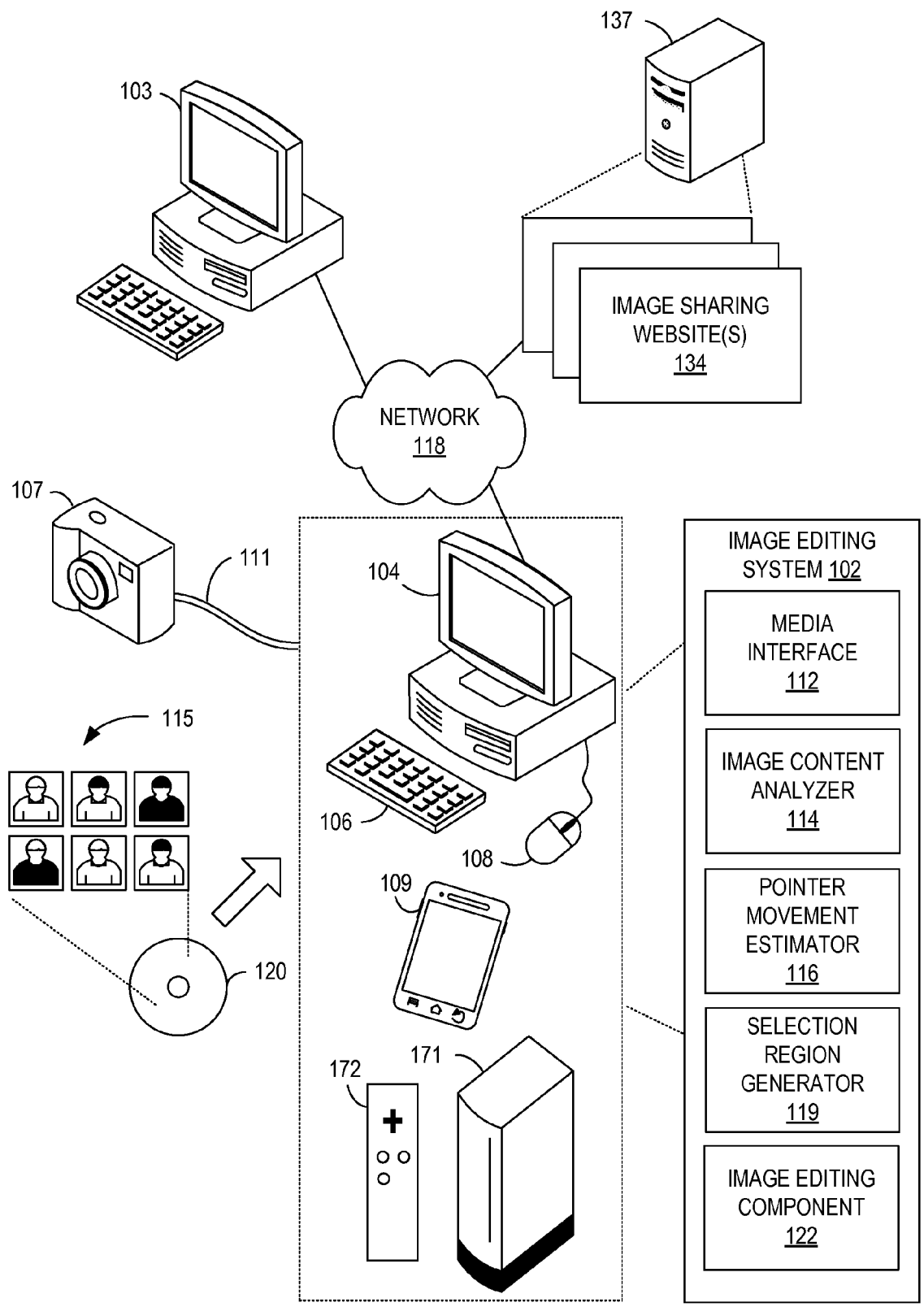
FIG. 1 is a block diagram of an image editing system for facilitating the selection of an object in accordance with various embodiments of the present disclosure.

A description of a system for facilitating the selection of objections for editing purposes is now described followed by a discussion of the operation of the components within the system. FIG. 1 is a block diagram of an image editing system 102 in which embodiments of the image processing techniques disclosed herein may be implemented. The image editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the image editing system 102 is embodied as a smartphone 109 or tablet, the user may interface with the image editing system 102 via a touchscreen interface (not shown). In other embodiments, the image editing system 102 may be embodied as a video gaming console 171, which includes a video game controller 172 for receiving user preferences. For such embodiments, the video gaming console 171 may be connected to a television (not shown) or other display 104.

The image editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the image editing system 102. As one of ordinary skill will appreciate, the digital media content 115 may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats.

As depicted in FIG. 1, the media interface 112 in the image editing system 102 may also be configured to retrieve digital media content 115 directly from a digital camera 107 where a cable 111 or some other interface may be used for coupling the digital camera 107 to the image editing system 102. The image editing system 102 may support any one of a number of common computer interfaces, such as, but not limited to IEEE-1394 High Performance Serial Bus (Firewire), USB, a serial connection, and a parallel connection.

The digital camera 107 may also be coupled to the image editing system 102 over a wireless connection or other communication path. The image editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image editing system 102 may receive digital media content 115 from another computing system 103. Alternatively, the image editing system 102 may access one or more image sharing websites 134 hosted on a server 137 via the network 118 to retrieve digital media content 115.

The image content analyzer 114 in the image editing system 102 is configured to analyze and identify attributes of the media content 115 retrieved by the media interface 112 in order to facilitate the selection of objects within the media content 115 for editing purposes. For some embodiments, the image content analyzer 114 obtains a first position within a digital image, wherein the image content analyzer 114 is further configured to identify an object corresponding to the first position. The first position may be specified by a user, for example, via a mouse or a touchscreen interface.

The pointer movement estimator 116 is configured to determine variation in the position of the pointer relative to a previous position, where the pointer movement estimator 116 is further configured to predict future movement by the pointer based on the variation in position. Based on the predicted future movement of the pointer derived by the pointer movement estimator 116, the selection region generator 119 facilitates selection of the object by adjusting the first selection region. The image editing system 102 may further comprise an image editing component 122 configured to perform such editing operations as copying, pasting, color modification, etc. on the final region selection.

Figure 2:
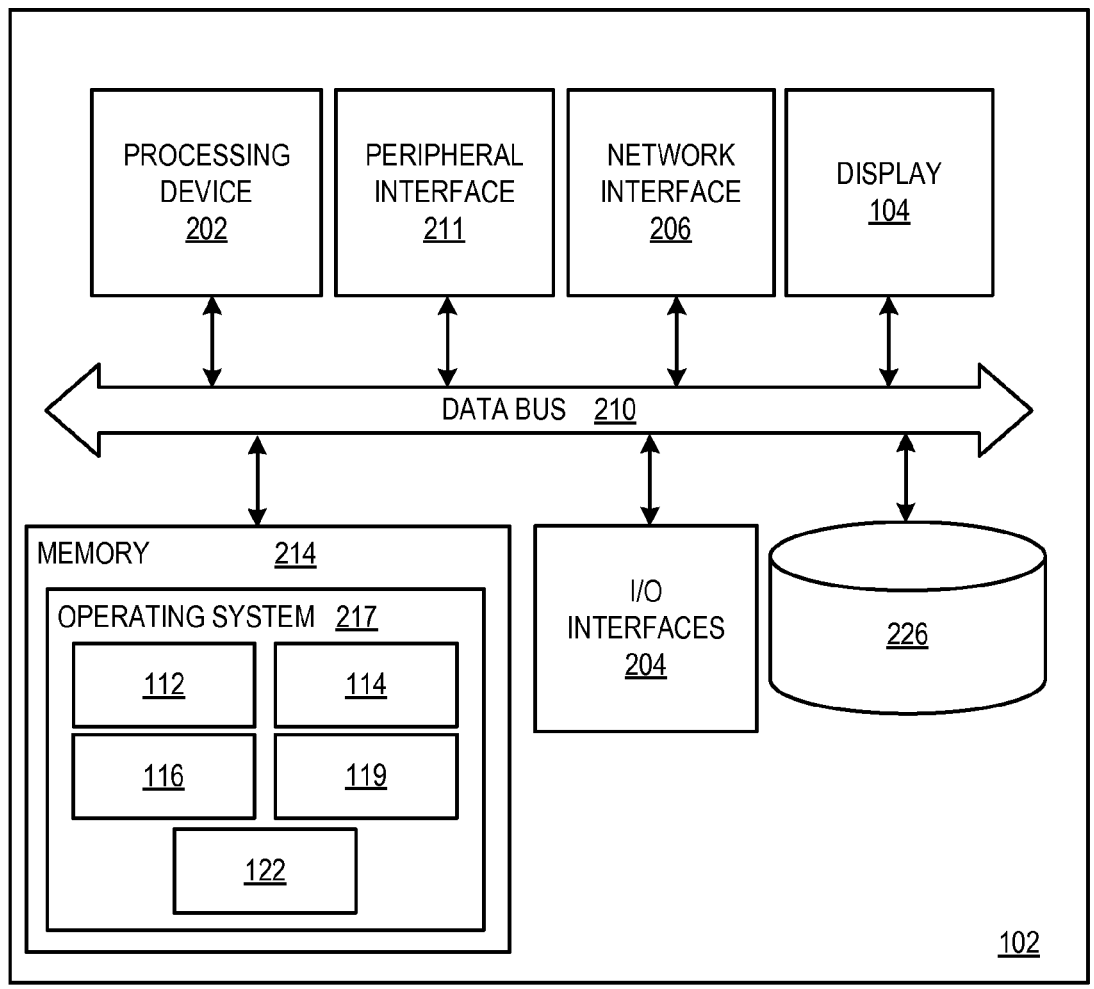
FIG. 2 is a detailed view of the image editing system device of FIG. 1 in accordance with various embodiments of the present disclosure.

FIG. 2 is a schematic diagram of the image editing system 102 shown in FIG. 1. The image editing system 102 may be embodied in any one of a wide variety of wired and/or wireless computing devices, such as a desktop computer, portable computer, dedicated server computer, multiprocessor computing device, smartphone 109 (FIG. 1), tablet computing device, and so forth. As shown in FIG. 2, the image editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the image editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, image content analyzer 114, pointer movement estimator 116, selection region generator 119, image editing component 122) of the image editing system 102 depicted in FIG. 2. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the image editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The image editing system 102 may communicate with one or more computing devices via the network interface 206 over the network 118 (FIG. 1). The image editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
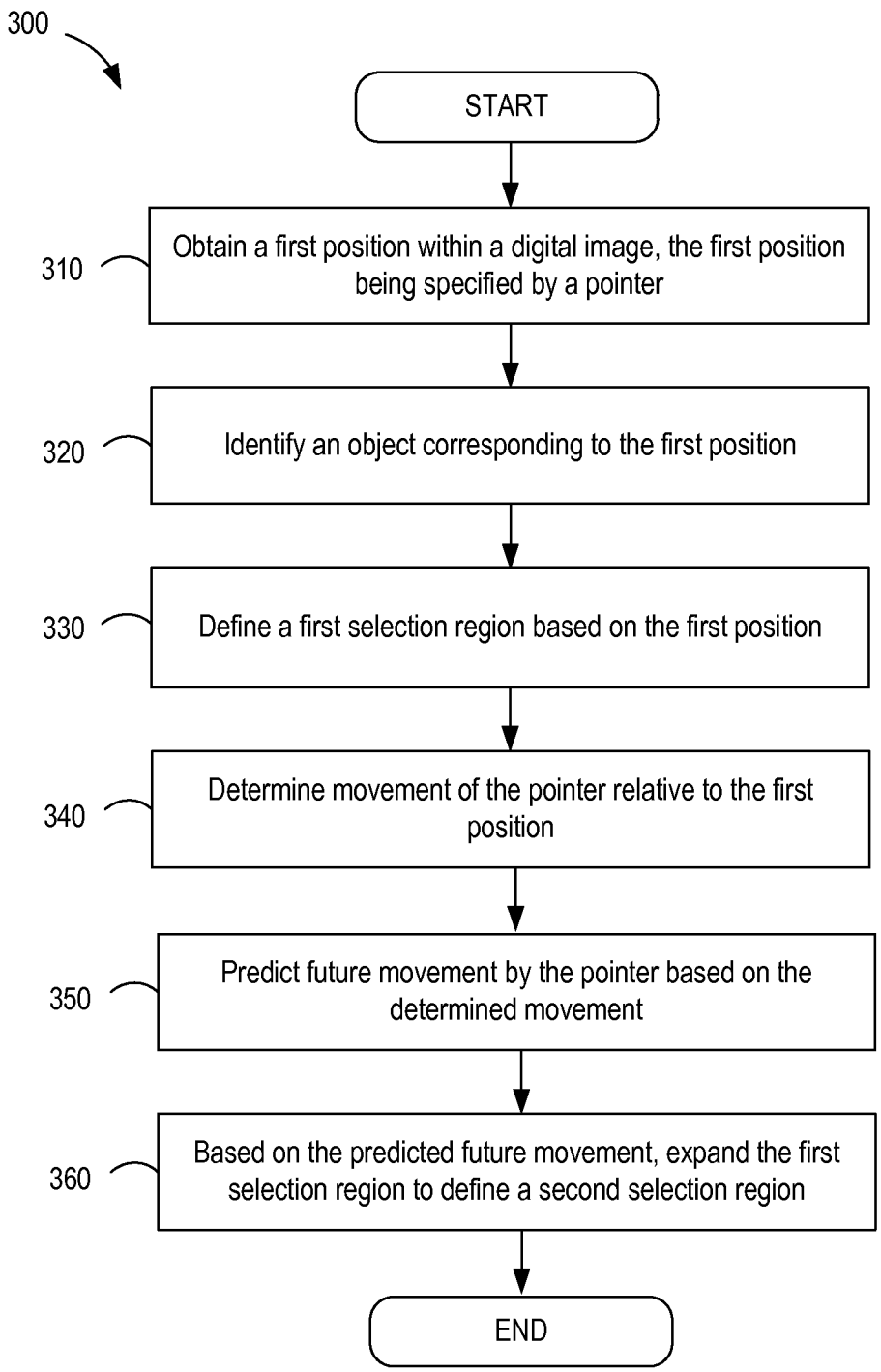
FIG. 3 is a top-level flowchart illustrating examples of functionality implemented as portions of the image editing device of FIG. 1 for facilitating the selection of objects according to various embodiments of the present disclosure.

Reference is made to FIG. 3, which is a flowchart 300 in accordance with one embodiment for facilitating object selection by analyzing movement of a pointer and dynamically adjusting a selection region. It is understood that the flowchart 300 of FIG. 3 provides merely an example of the many different types of functional arrangements that may be employed to implement the operation of the various components of the image editing system 102 (FIG. 1). As an alternative, the flowchart of FIG. 3 may be viewed as depicting an example of steps of a method implemented in the image editing system 102 according to one or more embodiments.

Beginning with block 310, a first position within a digital image is obtained, where the first position is specified by a pointer controlled by the user via a mouse, touchscreen interface, or other pointing device. In block 320, an object corresponding to the first position is identified. In accordance with some embodiments, the object may be selected according to a logical object boundary. For example, suppose that a user places the pointer on one of the flower pedals within a flower object in a digital image. In accordance with some embodiments, the single flower pedal, rather than the entire flower object, is—identified as the object of interest, thereby providing the user with finer resolution for performing image editing operations.

In block 330, a first selection region is defined based on the first position within the object of interest. For some embodiments, the first selection region is defined based on the relative size of the object of interest. In block 340, the movement of the pointer is determined relative to the first position of the pointer. For example, a determination is made on whether the pointer (e.g., mouse pointer) is moving to the right in a downward direction or to the left in an upward direction.

In block 350, the future movement by the pointer is predicted based on the determined movement. In block 360, based on the predicted future movement, the first selection region is expanded to define a second selection region. Editing operations may then be performed on the second selection region. Note, however, that operations other than editing may also be performed on the second selection region, including saving the second selection region as a mask for later editing.

Figure 4:
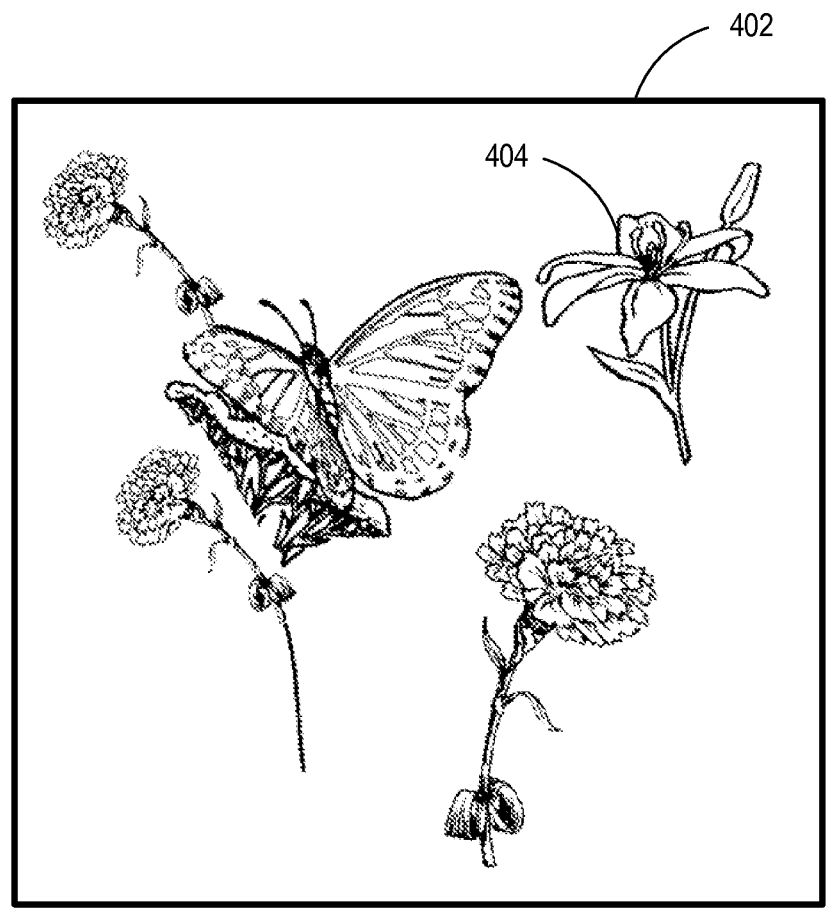
FIG. 4 is an example digital image to be processed by the image editing system of FIG. 1 in accordance with various embodiments of the present disclosure.

To further illustrate the object selection techniques disclosed, reference is made to FIGS. 4-12, which illustrate various aspects of object selection in accordance with various embodiments of the present disclosure. Shown in FIG. 4 is an example of a digital image 402, which the user wishes to edit. As shown, the digital image 402 comprises various objects, including a target object or object 404 of interest. As one can appreciate, selecting objects by manually drawing an outline around the object can be very time consuming. Even with conventional tools that incorporate automatic object selection, the user may still need to identify the object of interest by navigating the pointer within the object of interest and performing a series of selection operations. The various embodiments disclosed for object selection allow a user to quickly and efficiently select an object 404 with fewer operations.

Figure 5:
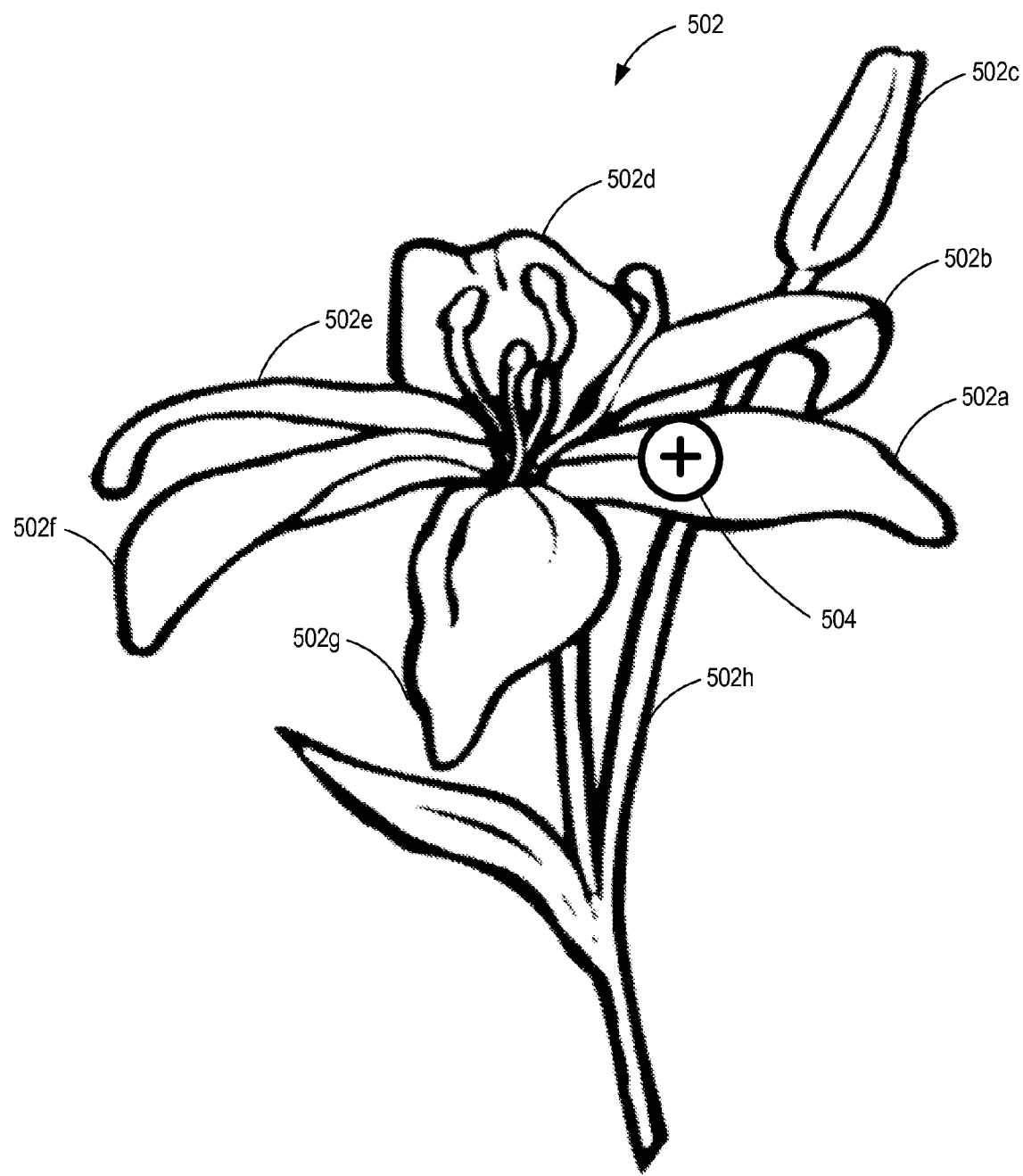
FIG. 5 illustrates the detection of various logical object boundaries within a flower object by the image content analyzer of FIG. 1 in accordance with various embodiments of the present disclosure.

FIG. 5 illustrates the detection of various logical object boundaries within a flower object by the image content analyzer 114 (FIG. 1). Suppose that the user wishes to edit the object 502 of interest (i.e., flower object) shown in the digital image 402 (FIG. 4). For example, suppose that the user wishes to modify the color of one of the flower pedals. The flower object 502 shown includes a series of smaller objects 502a-h, which include flower pedals, the flower stem, etc. The image content analyzer 114 obtains a first position of the pointer 504.

In example shown, the pointer 504 is placed within one of the flower pedals 502a, and the user performs a selection operation (e.g., a left mouse click via a mouser pointer) to specify the first position of the pointer. Note that the various embodiments disclosed facilitate the selection of a region or an object within a digital image 402 via interaction and refinement by the user utilizing the pointer 504. Note also that as the current example is described in the context of two selections, the various embodiments are not limited to a first and second selection. Rather, the user may use a plurality of selections by the pointer 504 to define a selection region.

Figure 6:
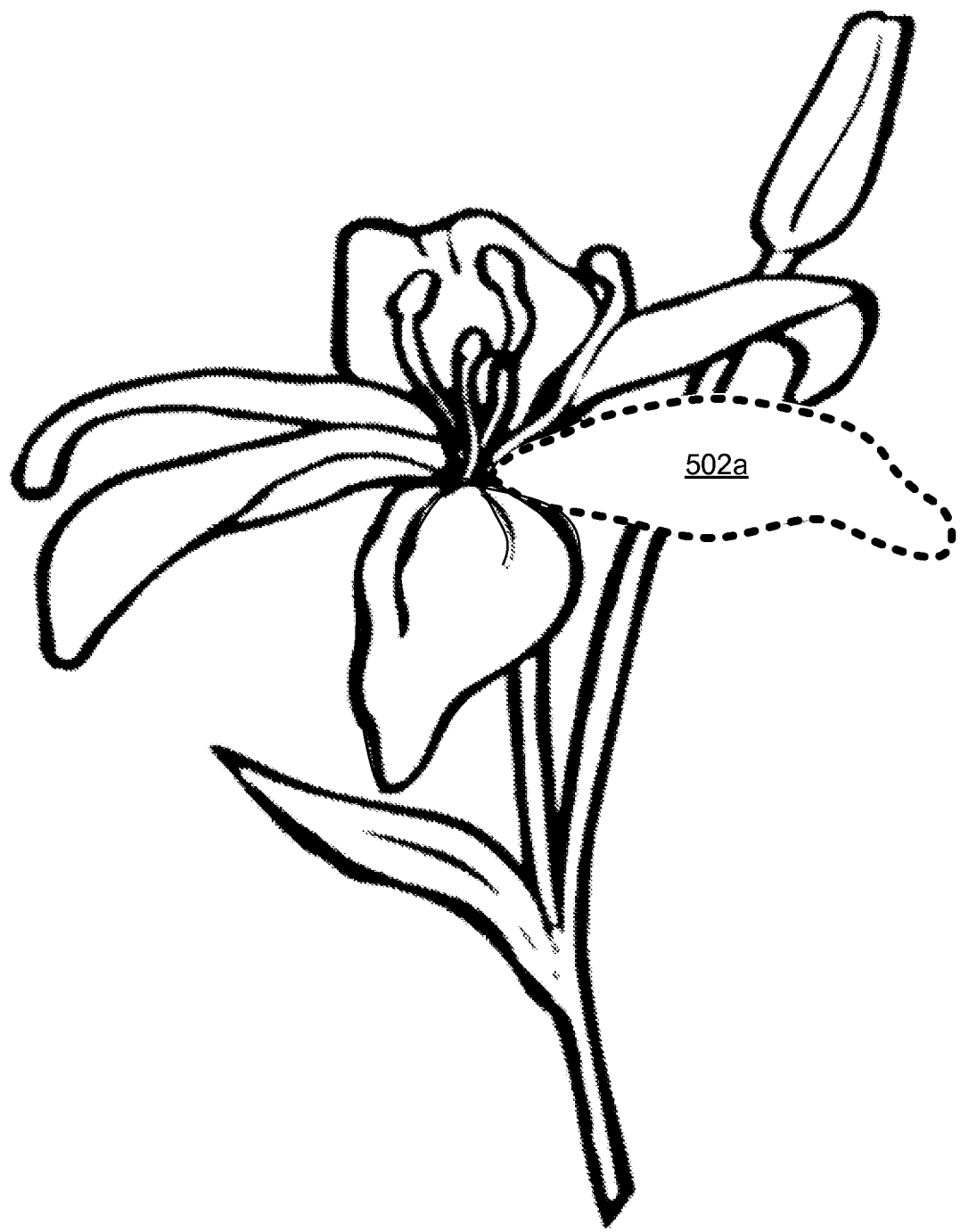
FIG. 6 illustrates the identification of an object of interest by the image content analyzer of FIG. 1 based on a first position of a pointer in accordance with various embodiments of the present disclosure.

The first position specified by the user may serve as an indication that the user wishes to perform a selection operation within the flower pedal 502a, as shown in FIG. 6. The image editing system 102 facilitates this selection by allowing the user to define a first selection region and then further refining the selection region. Thus, the image editing system 102 (FIG. 1) allows the user to define a selection region within the flower pedal 502a, thereby providing the user with finer resolution for editing purposes. For example, user may wish to only modify the color of half of the flower pedal 502a.

Figure 7:
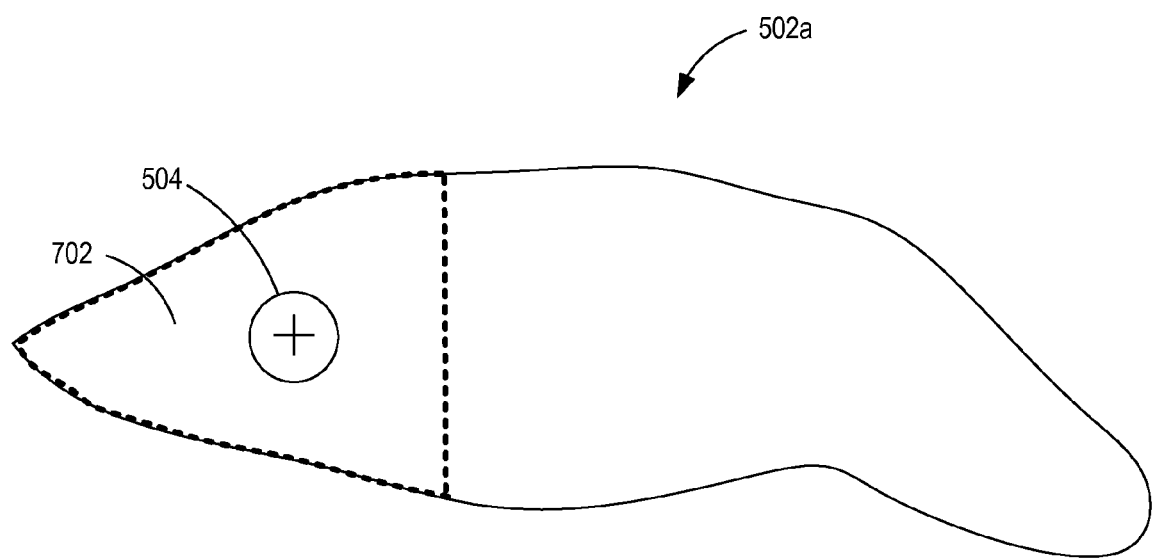
FIG. 7 illustrates the definition of a first selection region by the selection region generator in FIG. 1 within the object of interest in accordance with various embodiments of the present disclosure.

Reference is made to FIG. 7, which illustrates a first selection region 702 defined by the selection region generator 119 (FIG. 1) based on the first position of the pointer 504 within the object 502a of interest. As discussed above, the user may designate the first position by performing a left mouse click or other operation. For example, where the image editing system 102 (FIG. 1) is embodied as a smartphone 109 (FIG. 1) or tablet, the user can specify the first position of the pointer 504 by touching a touchscreen display with a finger or stylus.

Figure 8:
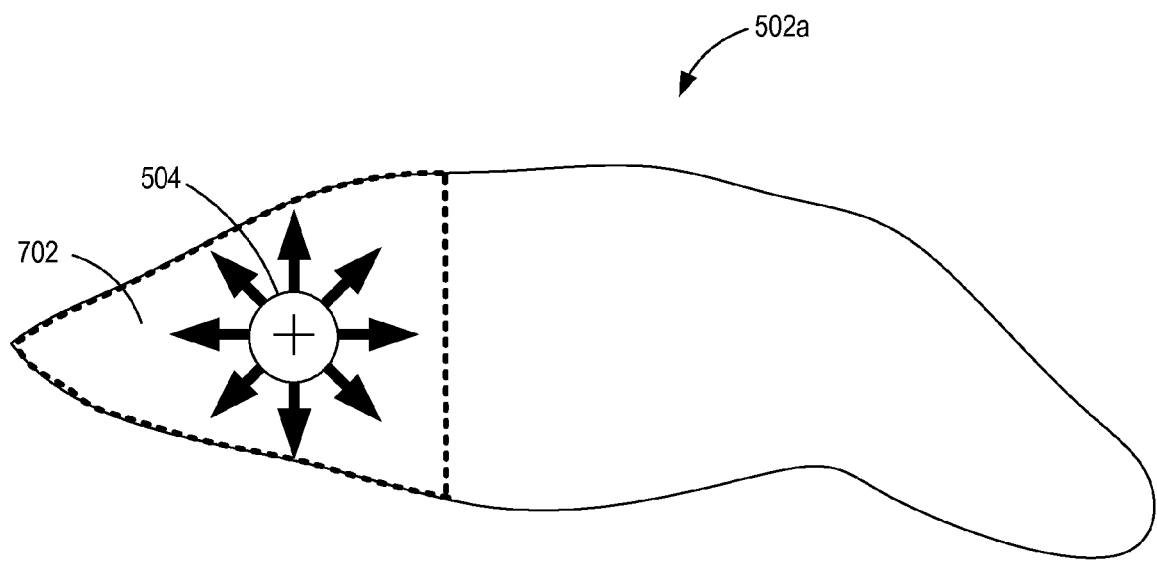
FIGS. 8 and 9 illustrate movement by the pointer and the prediction of future movement of the pointer by the pointer movement estimator in FIG. 1 for expansion of the selection region in accordance with various embodiments of the present disclosure.

As illustrated in FIG. 8, the user may move the pointer 504 from the first position in any number of directions. Based on the direction of movement of the pointer, the image editing system 102 (FIG. 1) predicts future movement of the pointer by the user in order to modify (e.g., expand) the first selection region 702 (FIG. 7) and ultimately define a final selection region for editing purposes.

Figure 9:
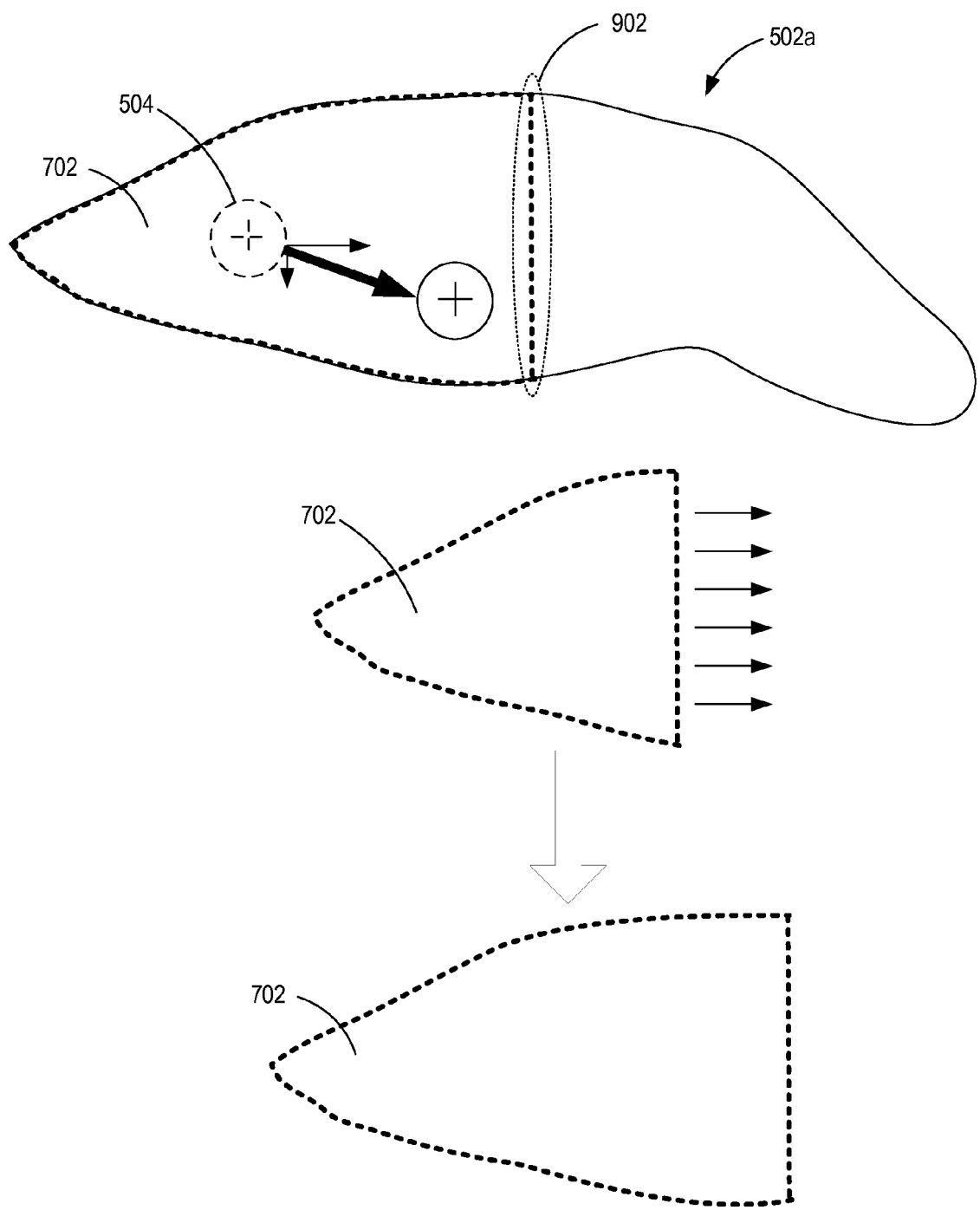

Reference is made to FIG. 9, which illustrates expansion of the first selection region 702 based on movement of the pointer 504 from the first position defined by the user. The pointer movement estimator 116 (FIG. 1) monitors movement of the pointer 504 and predicts future movement by the pointer 504. Based on the predicted future movement, the selection region generator 119 (FIG. 1) modifies the size of the first selection region 702. In accordance with various embodiments, the pointer movement estimator 116 determines a predominant direction of movement of the pointer 504. For example, as shown in FIG. 9, the pointer 504 moves in a downward direction to the right.

Based on the updated position of the pointer 504 relative to the first position of the pointer 504, the pointer movement estimator 116 determines that the predominant direction of movement by the pointer 504 is to the right (versus the downward direction). Based on this determination by the pointer movement estimator 116, the pointer movement estimator 116 predicts that the pointer 504 will continue to move to the right. For various embodiments, the selection region generator 119 expands the first selection region 702 in the predominant direction. Note, however, that expansion of the selection region 702 is not limited to only the predominant direction determined by the pointer movement estimator 116. For some embodiments, the selection region 702 may be expanded in multiple directions, depending on the size of the first selection region and the size of the object.

In accordance with various embodiments, the selection region generator 119 makes a determination on whether to expand the selection region 702 or not based on the position of the pointer 504 and the boundary of the selection region 702. As shown in FIG. 9, for example, the selection region generator 119 may expand the selection region 702 only when the pointer 504 arrives at the right edge 902 of the selection region. This type of determination is often used by conventional algorithms for purposes of saving computational resources. When the pointer 504 is still inside the selection region 702, it is not necessary for the selection region generator 119 to compute a newly expanded region. The computation is only required when the user expresses the intention of expanding the region by moving the pointer to the boundary of selection region. However, such a determination generally results in the user performing additional operations to select an entire object when the object is lengthy in nature (such as a flower pedal 502a). For some embodiments, the selection region generator 119 may expand the selection region 702 according to a limited range of expansion. For such embodiments, the range of expansion is defined according to a predetermined distance from the first position of the pointer 504. For example, the predetermined distance may be defined according to a predetermined number of pixels.

In order to reduce the overhead associated with user operations and in order to avoid utilizing an excessive amount of computational resources, the selection region generator 119 may be configured to make the determination of whether to expand the region by also processing information from the pointer movement estimator 116. For example, a threshold may be defined in the pointer movement estimator 116 that corresponds to an amount of movement by the pointer 504 within a predetermined period of time. If the amount of movement by the pointer 504 exceeds the threshold (i.e., where there is a significant movement by the pointer 504), a determination may be made by the selection region generator 119 to expand the region. In such cases, the selection region generator 119 may make a determination to expand the selection region 702 even without the pointer 504 arriving at the boundary 902.

For some embodiments, the boundary of an adjustable mask surrounding the pointer 504 is used to determine whether to expand the selection region 702, wherein the selection region 702 is expanded as the boundary of the mask approaches or arrives at the boundary 902. In the example shown in FIG. 9, a mask comprising a circle is shown where the center of the mask corresponds to the location of the pointer 504. Note that the circle is merely an example as the mask may comprise any shape. Furthermore, in accordance with various embodiments, the mask may be adjusted by the user. For some embodiments, the determination of whether to expand the selection region 702 may also be based on the predicted future movement corresponding to a predetermined criteria. The predetermined criteria may comprise, for example, exceeding a threshold amount of movement by the pointer within a predetermined period of time.

The selection region generator 119 may also be configured to expand the selection region when a predominant direction of movement by the pointer 504 is detected by the pointer movement estimator 116. In such cases, the movement of the pointer 504 tends to reflect a strong intention by the user of expanding the selection region. Therefore, the expansion is performed prior to the pointer 504 reaching a boundary of the selection region. If such an intention by the user is not detected, the determination of whether to expand the region may still be made based on conventional algorithms to save the computational resources.

For some embodiments, expansion of the selection region 702 is performed according to an incremental amount, where the incremental amount is defined as a function of the movement by the pointer 504. For some embodiments, the incremental amount may also be defined as a function of the rate of traversal of the pointer 504 as well as the direction of traversal. For example, faster movement of the pointer 504 by the user may result in expansion of the selection region 702 by a larger incremental amount in the direction of movement, whereas slower movement of the pointer 504 may results in expansion by a smaller incremental amount. In this regard, the image editing system 102 (FIG. 1) attempts to predict the user's intention during the selection process. Furthermore, for some embodiments, the selection region 702 may increase by a relatively smaller amount in the directions other than the direction of movement by the pointer 504.

Figure 10:
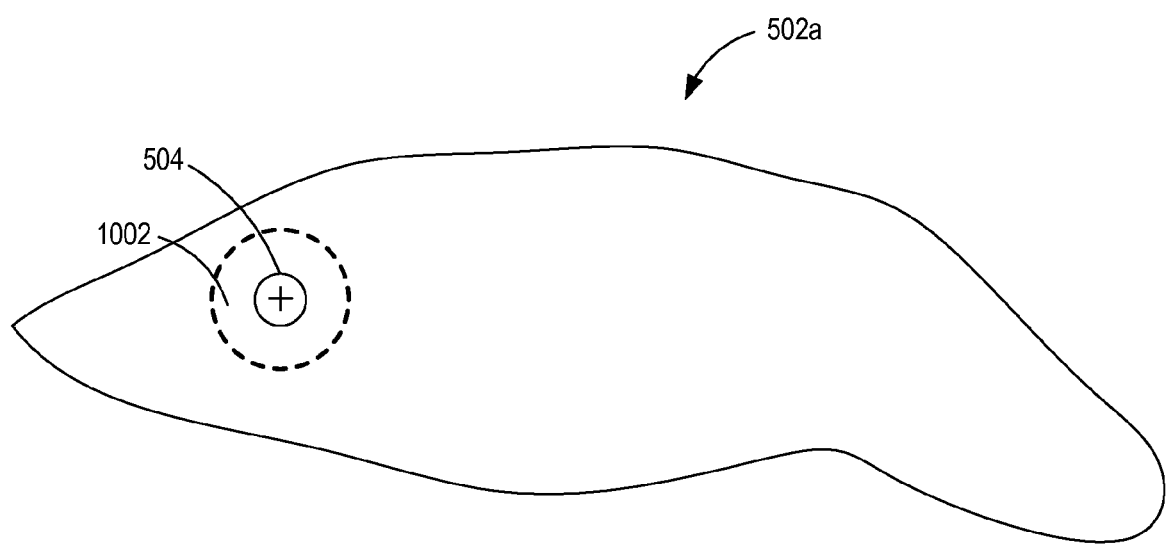
FIG. 10 illustrates implementation of a smaller first selection region in accordance with alternative embodiments of the present disclosure.

Note also that the first selection region 702 is not limited to the example shown in FIG. 7. For example, FIG. 10 illustrates a first selection region 1002 defined based on the first position of the pointer 504 within the object 502a where the first selection region 1002 covers a smaller portion of the object 502a than the first selection region 702 shown in FIG. 7. The smaller first selection region 1002 provides the user finer resolution in selection a region of interest within the object 502a. However, more operations may be needed in order to select the entire object 502a. In this regard, a larger first selection region 702 may facilitate faster selection of the entire object 502a of interest.

Figure 11:
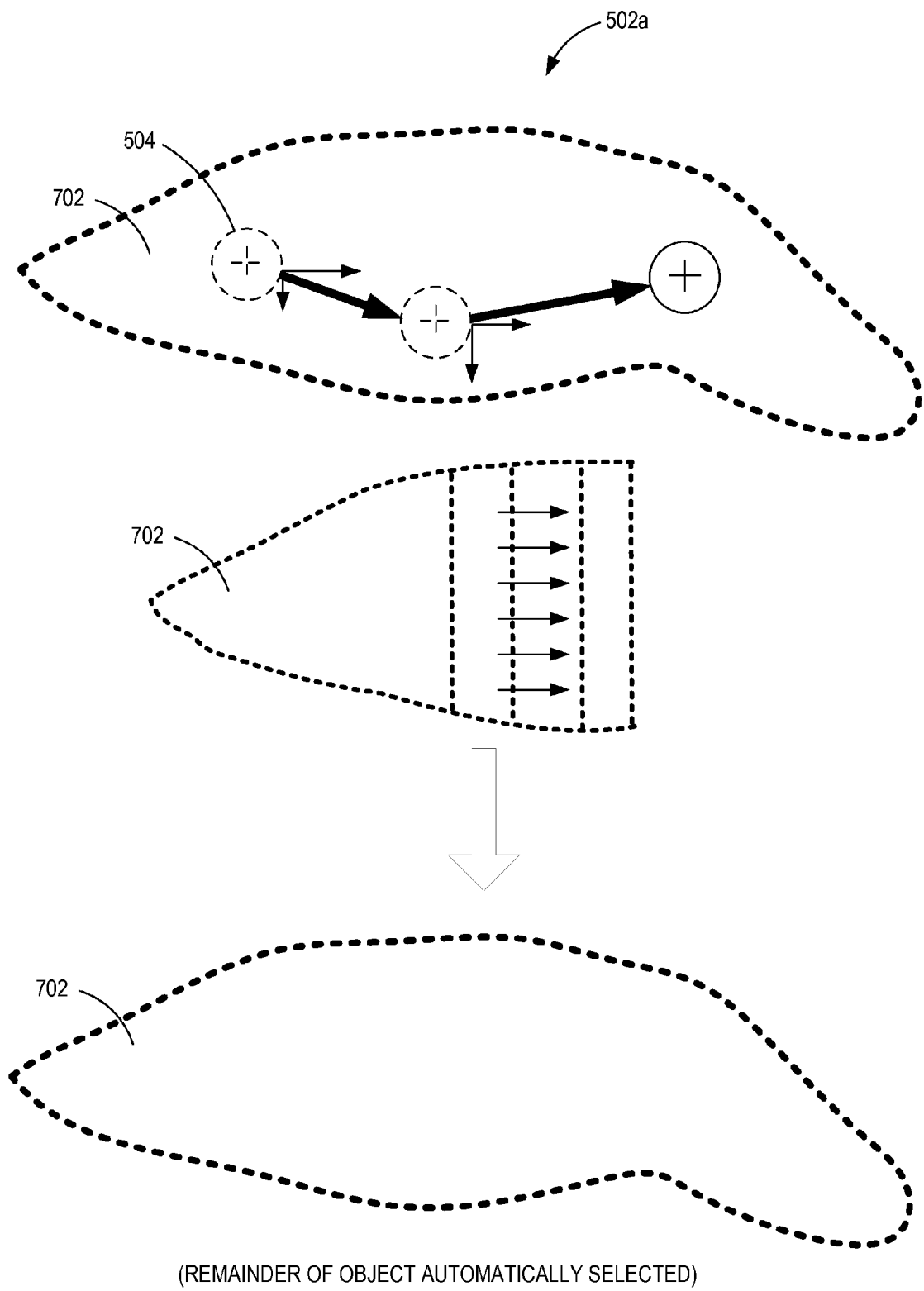
FIG. 11 illustrates selection of the remainder of an object of interest by the selection region generator of FIG. 1 in response to a trigger condition in accordance with various embodiments of the present disclosure.

Reference is made to FIG. 11, which illustrates another aspect of various embodiments where the remainder of the object 502a is automatically selected. For some embodiments, the selection region generator 119 (FIG. 1) may be configured to simply select the remainder of the object 502a upon a certain number of expansions of the first selection region 702. In the illustration shown, the pointer movement estimator 116 (FIG. 1) predicts, based on past locations of the pointer 504, that the user intends to select the entire object 502a. Based on the trend in pointer 504 locations, the pointer movement estimator 116 differentiates between focused movement of the pointer 504 and random motion by the pointer 504.

Based on a predetermined number of expansions, the selection region generator 119 may determine that there is a high probability that the user intends to simply select the entire object 502a rather than a region within the object 502a. For some embodiments, the selection region generator 119 may assign a probability value upon each expansion operation of the selection region 702. Upon reaching a threshold probability, the selection region generator 119 may define a final selection region that encompasses the entire object 502a. In accordance with some embodiments, the selection region generator 119 defines a final selection region that encompasses the entire object 502a if the majority of the object 502a is covered by the current selection region 702. In this regard, the user avoids having to navigate the pointer 504 across the entire object 502a in order to select the object 502a. At the same time, the image editing system 102 (FIG. 1) provides the user with the flexibility of selecting only a portion of the object 502a for editing purposes.

Reference is made to FIGS. 12A and 12B, which illustrate prediction of future movement by the pointer in accordance with various embodiments. For some embodiments, the future movement of the pointer may be predicted based analyzing the movement between a first position and a second position. To increase the accuracy of the predicted movement, however, a history of positions of the pointer (i.e., those prior to the first position) may be analyzed as well, as illustrated in FIG. 12A. For some implementations, when a user moves the pointer, the positions of the pointers are recorded as a sequence as the predicted movement of the pointer tends to be more stable and robust when a larger sample size is analyzed.

Vectors representing movement by the pointer between the various points are derived. The average and standard deviation of the vectors are also calculated. If the standard deviation is relatively small when compared to the averaged vector, the averaged vector is likely a strong prediction of the future movement. If the standard deviation is large, however, this may serve as an indication that the pointer is moving in an inconsistent manner, thereby making it more difficult to predict future movement, as illustrated in FIG. 12B. For such scenarios, the future movement of the pointer may be defined as an unstable direction and is therefore not taken into account when determining whether to expand the selection region. Instead, expansion of the selection region may be based only on the movement between the first and second positions.

Note that for some embodiments, the image content may also be taken into consideration when expanding the selection region based on predicted future movement of the pointer. For example, the color intensities may be analyzed in predicting future movement. Consider, for example, an image depicting a white flower against a dark background. Suppose, for purposes of illustration, that movement by the pointer has been localized within the white flower region. For some embodiments, when the user moves the pointer along the path, a determination is made that the pointer is moving in a consistent, rightward direction. Hence, a rightward, future movement is predicted.

Suppose, however, that the final location of the pointer is very close to the boundary of the flower (i.e., near an edge). Expanding the selection region would result in the selection region encompassing regions outside the white flower. In accordance with some embodiments, this is avoided by determining if the predicted future movement involves crossing a strong edge as a strong edge may correspond to the object boundary. If the predicted future movement involves crossing a strong edge, the selection region may still be expanded, but in smaller increments. This is based on the general assumption that the user wishes to select a single object.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method for editing a digital image in an image editing device, comprising:
    obtaining a first position within an object of interest in the digital image, the first position being specified by a pointer;
    defining a first selection region based on the first position, the first selection region corresponding to at least a portion of the object of interest;
    obtaining a second position within the digital image, the second position being specified by the pointer;
    determining movement of the pointer between the first position and the second position;
    predicting future movement by the pointer based on a determined movement; and
    based on the determined movement and a predicted future movement, expanding the first selection region to define a second selection region.

2. The method of claim 1, wherein determining movement of the pointer comprises:
    in response to movement of the pointer, determining a predominant direction of movement by the pointer.

3. The method of claim 2, wherein the predominant direction is categorized as one of: an upward direction, a downward direction, a right direction, and a left direction.

4. The method of claim 2, wherein the predicted future movement of the pointer corresponds to the determined predominant direction.

5. The method of claim 1, wherein expanding the first selection region based on the predicted future movement comprises expanding the first selection region according to an incremental amount.

6. The method of claim 5, wherein the incremental amount is dynamically adjusted according to the predicted future movement by the pointer.

7. The method of claim 5, wherein the incremental amount is dynamically adjusted according to a rate of traversal of the pointer.

8. The method of claim 1, wherein expanding the first selection region is performed according to a limited range of expansion, and wherein the range of expansion is defined according to a predetermined distance from the first position of the pointer.

9. The method of claim 8, wherein the limited range of expansion is adjustable by relatively larger increments in a direction of the predicted movement.

10. The method of claim 8, wherein the limited range of expansion is adjustable by relatively smaller increments in directions other than a direction of the predicted movement.

11. The method of claim 1, wherein the second selection region is defined such that a region within the digital image has higher probability of being located within the second selection region responsive to the pointer moving according to the predicted future movement.

12. The method of claim 1, wherein predicting future movement by the pointer based on the determined movement comprises:
  calculating at least one vector corresponding to at least one position obtained prior to the first position and a vector corresponding to transition from the first position to the second position;
  determining an average of all the vectors;
  determining a standard deviation; and
  predicting the future movement based on the average of vectors and the standard deviation.

13. The method of claim 1, wherein expanding the first selection region to define the second selection region based on the determined movement and the predicted future movement, comprises:
  determining whether the predicted future movement corresponds to movement of the pointer across an edge; and
  based on the determination, adjusting an increment amount for expanding the first selection region to define the second selection region.

14. A system for editing a digital image, comprising:
  an image content analyzer configured to obtain a first position and a second position within the digital image, the positions being specified by a pointer;
  a selection region generator configured to define a first selection region based on the first position, the first selection region corresponding to at least a portion of an object of interest; and
  a pointer movement estimator configured to determine movement of the pointer between the first position and the second position, wherein the pointer movement estimator is further configured to predict future movement by the pointer based on a determined movement, wherein the selection region generator facilitates selection of the object by expanding the first selection region to define a second selection region based on the determined movement and the predicted future movement.

15. The system of claim 14, further comprising an image editing component configured to edit the digital image according to the selection region.

16. The system of claim 14, wherein the pointer movement estimator determines a predominant direction of movement by the pointer in response to movement of the pointer.

17. The system of claim 16, wherein the predominant direction is categorized as one of: an upward direction, a downward direction, a right direction, and a left direction.

18. The system of claim 14, wherein the selection region generator adjusts the first selection region based on the predicted future movement by expanding the first selection region according to an incremental amount.

19. The system of claim 18, wherein the incremental amount is dynamically adjusted according to the predicted future movement by the pointer.

20. The system of claim 14, wherein expanding the first selection region is performed according to a limited range of expansion, and wherein the range of expansion is defined according to a predetermined distance from the position of the pointer.

21. The system of claim 20, wherein the limited range of expansion is adjustable by relatively larger increments in a direction of the predicted movement.

22. The system of claim 21, wherein the limited range of expansion is adjustable by relatively smaller increments in directions other than a direction of the predicted movement.

23. The system of claim 14, wherein the selection region is modified such that a region within the digital image has higher probability of being located within the modified selection region responsive to the pointer moving according to the predicted future movement.

24. The system of claim 14, wherein the pointer movement estimator predicts future movement by the pointer based on the determined movement by calculating at least one vector corresponding to at least one position obtained prior to the first position and a vector corresponding to transition from the first position to the second position; determining an average of all the vectors; determining a standard deviation; and predicting the future movement based on the average of vectors and the standard deviation.

25. The system of claim 14, wherein the selection region generator expands the first selection region to define the second selection region based on the determined movement and the predicted future movement by determining whether the predicted future movement corresponds to movement of the pointer across an edge;
  and based on the determination, adjusting an increment amount for expanding the first selection region to define the second selection region.

26. A method for editing a digital image in an image editing device, comprising:
  defining a pointer surrounded by a mask having a specific shape;
  obtaining a first position within an object of interest in the digital image, the first position being specified by the pointer;
  defining a first selection region based on the first position, the first selection region corresponding to at least a portion of the object of interest;
  obtaining a second position within the digital image, the second position being specified by the pointer;
  determining movement of the pointer between the first position and the second position;
  predicting future movement by the pointer based on a determined movement; and
  based on the determined movement and a predicted future movement, determining whether to expand the first selection region to define a second selection region; and responsive to a determination to expand the first selection region, expanding the first selection region to define the second selection region.

27. The method of claim 26, wherein a shape of the mask is adjustable by a user.

28. The method of claim 26, wherein determining whether to expand the first selection region to define the second selection region is based on at least one of:

the mask surrounding the pointer reaching a boundary of the first selection region; and the predicted future movement corresponding to a predetermined criteria.

29. The method of claim 28, wherein the predetermined criteria comprises exceeding a threshold amount of movement by the pointer within a predetermined period of time.

30. The method of claim 26, wherein the pointer is controlled by one of:

a mouse and a touchscreen interface.

* * * * *